Jan. 20, 1959 R. W. COGGINS 2,869,675
METHODS AND MEANS FOR THE LOW TEMPERATURE SEPARATION
OF HIGH PRESSURE WELL STREAMS
Filed July 5, 1956 3 Sheets-Sheet 2
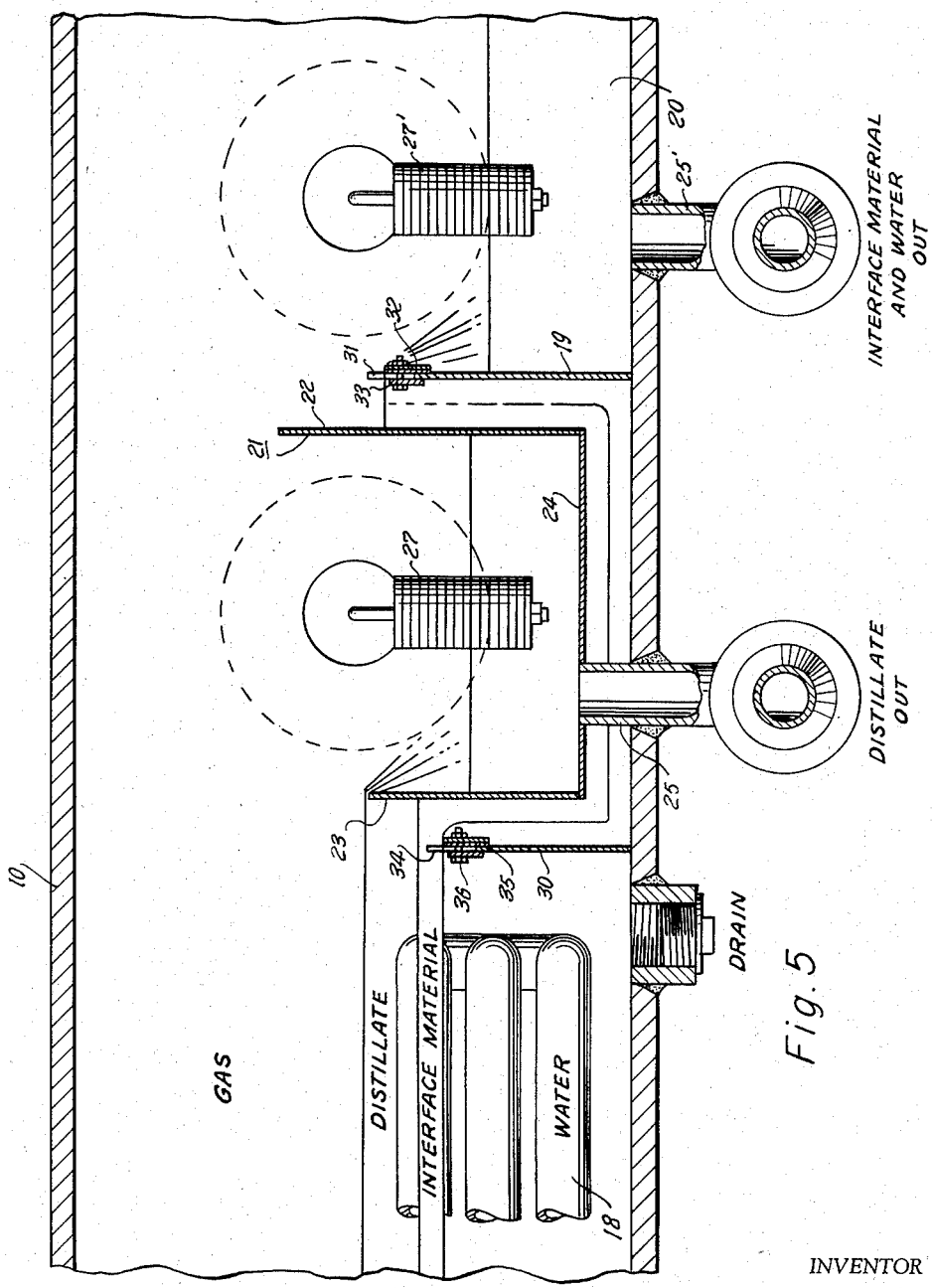
INVENTOR
Robert W. Coggins
BY
ATTORNEYS Jan. 20, 1959   R. W. COGGINS   2,869,675
METHODS AND MEANS FOR THE LOW TEMPERATURE SEPARATION
OF HIGH PRESSURE WELL STREAMS
Filed July 5, 1956   3 Sheets-Sheet 3
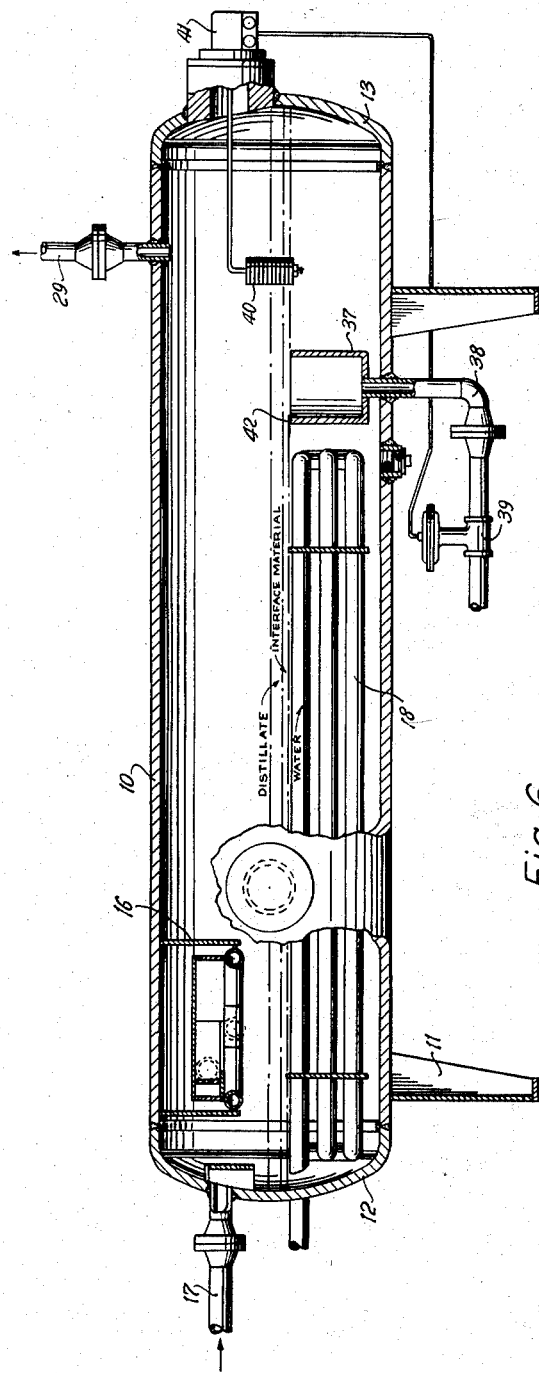
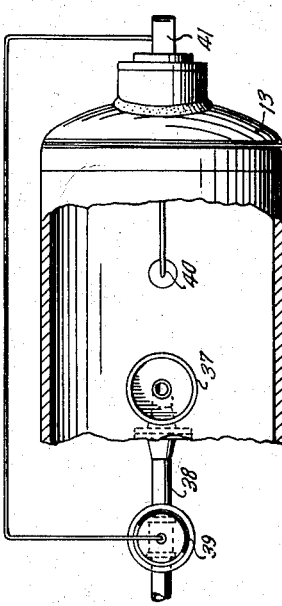
INVENTOR
Robert W. Coggins
BY Ashley & Ashley
ATTORNEYS

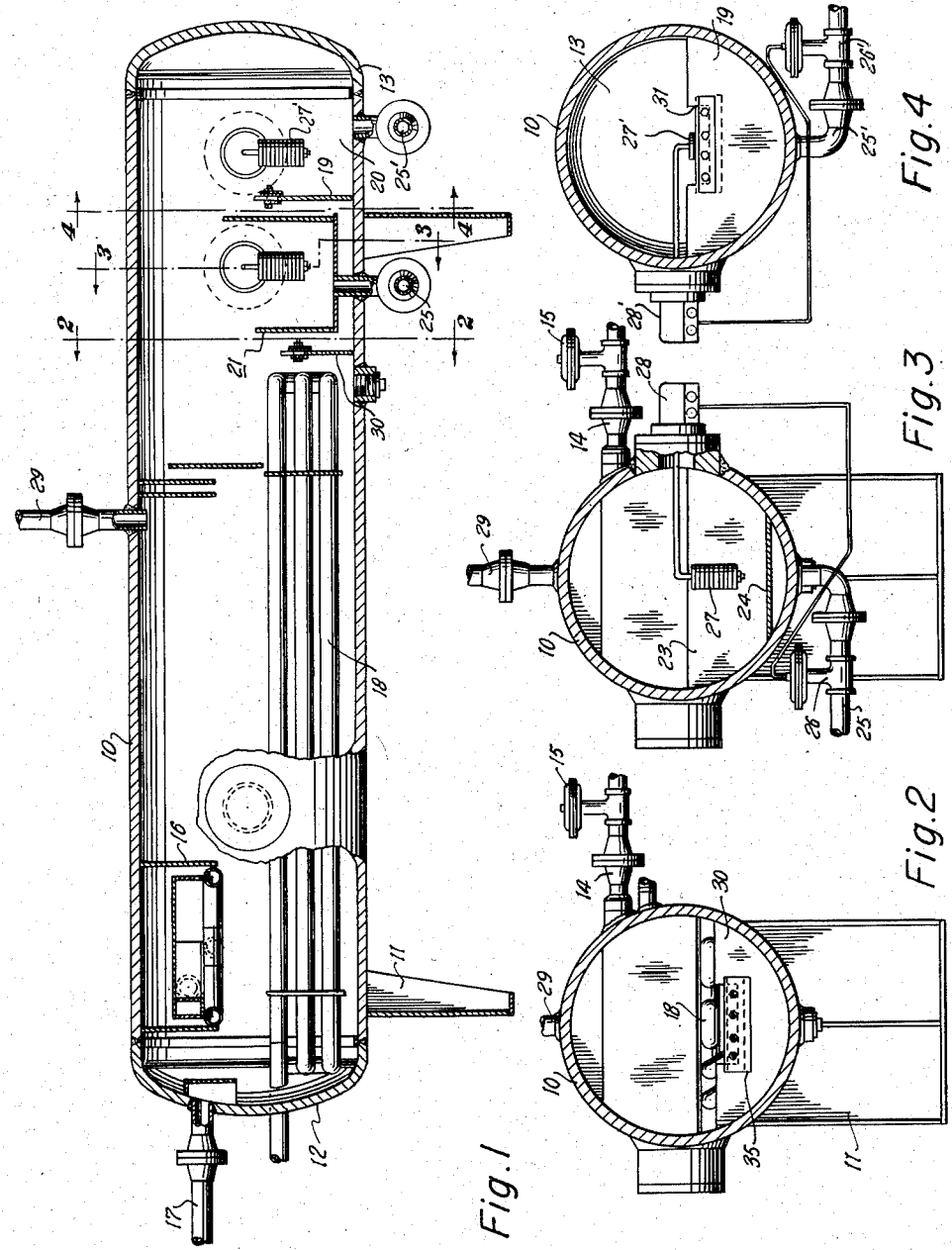

United States Patent Office 2,869,675
Patented Jan. 20, 1959

2,869,675

METHODS AND MEANS FOR THE LOW TEMPERATURE SEPARATION OF HIGH PRESSURE WELL STREAMS

Robert W. Coggins, Tulsa, Okla., assignor to National Tank Company, Tulsa, Okla., a corporation of Nevada Application July 5, 1956, Serial No. 595,914

7 Claims. (Cl. 183—2.7)

This invention relates to new and useful improvements in methods and means for the low temperature separation of high pressure well streams; and in particular, the separation from such streams of petroleum distillates, water, and hydrocarbon gases.

There have come into widespread use in the petroleum industry low temperature separation systems in which a high-pressure petroleum well stream is passed through a pressure reduction step in order to reduce the temperature of the flow stream sharply and result in the condensation and precipitation of valuable hydrocarbon constituents. The pressure reduction may or may not be accompanied by other cooling steps, such as heat exchange with a colder fluid, and with the injection of diethylene glycol, or some other suitable gas hydrate inhibitor, to prevent the formation of gas hydrates as the well stream undergoes temperature reduction. Normally, the process is also accompanied by a preliminary high pressure separation of the well stream into its liquid and gaseous components to remove from the stream any components which may be in the liquid phase at that point.

Following the chilling and/or pressure reduction of the well stream, it is conducted into a low temperature separation vessel wherein the stream stratifies into aqueous and hydrocarbon strata, and the denuded gas is drawn off as a separate phase. In those instances in which gas hydrates are allowed to form, heat is supplied to the liquid phases for the melting of these hydrates, and where a desiccant or inhibitor is employed, heat is also desirably applied to effect some degasification of the water stratum, along with a degree of stabilization of the hydrocarbon stratum. It is desirable that the heat be applied primarily to the water stratum, which, of course, is lowermost in the vessel, in order that excessive vaporization of the recovered hydrocarbons be prevented. Hence, the necessary small degree of heating of the hydrocarbon stratum, as well as the applying of heat to melt any gas hydrates which normally are present on the surface of the hydrocarbon stratum or at the interface between the water and hydrocarbon strata, must be transferred upwardly through the interface area or zone.

In many instances, there is present in the well stream mud or other foreign material from the well bore, iron sulphide emulsion, dead bacteria which occur in petroleum wells, and other material which accumulates at the interface between the water and hydrocarbon layers. This medial layer of foreign material acts as a heat barrier and ofttimes prevents the proper transfer of heat for the melting or decomposition of the gas hydrates, resulting in the clogging or freezing up of the low temperature separation vessel. It is therefore desirable that the accumulation of such interface materials be prevented.

As pointed out hereinabove, it is customary to employ a high pressure separator in advance of the low temperature separation vessel, but such high pressure separators have not been effective for the removal of the various foreign materials which tend to accumulate at the interface level.

In some types of low temperature separation systems, a single, float operated, discharge conductor is provided for conducting separated liquids from the vessel, but, since such conductors drain from the lowermost part of the vessel, it is obvious that the water stratum will be discharged first, and that the vessel will at all times be substantially full of the separated hydrocarbons. Such a system will result in the removal of the interface material, but has the undesirable effect of causing the necessary heat to be applied directly to the hydrocarbon layer and result in the excessive heating of the layer and volatilization of valuable and recoverable hydrocarbons therefrom. It is, therefore, desirable that a lower stratum of water be maintained in the vessel at all times, and that the necessary heat be applied through said stratum.

There are instances in which the formation of gas hydrates in the well stream as it is chilled, is prevented by the injection of a desiccant or inhibitor, and no heat is applied in the low temperature separation step. Even so, it may be desirable or necessary to prevent the accumulation and building up of a layer of foreign matter in the low temperature separation vessel.

The present invention solves these various problems by maintaining a water stratum in the lower portion of the low temperature vessel, and at the same time, by providing for preferential withdrawal of accumulated interface material prior to withdrawal of the separated water. Thus, at all times, the interface is maintained relatively free of foreign matter in the interface level, and effective heat transfer from the water stratum to the gas hydrates and the hydrocarbon stratum is made possible.

The principal object of this invention, therefore, is to provide an improved method and means for the low temperature separation of high pressure well streams in which means is provided for preventing the accumulation of interface material between the separated water and hydrocarbon strata.

A further object of the invention is to provide a method and means of the character described in which interface material is preferentially withdrawn, prior to the withdrawal of water, and effective heat transfer between the water and hydrocarbon layers, or the layer of accumulated gas hydrates, maintained.

A particular object of the invention is to provide an improved method and means of the character described in which separated water and hydrocarbons are withdrawn separately from the low temperature separation vessel, accompanied by preferential withdrawal of any interface material which may tend to accumulate between the water and hydrocarbon strata.

Yet another object of the invention is to provide a structure of the character described in which various baffle or weir structures are employed, which latter structures may or may not be adjustable in nature to permit the desired regulation of the various liquid and interface levels within the low temperature separation vessel.

A construction designed to carry out the invention will be hereinafter described, together with other features of the invention.

The invention will be more readily understood from a reading of the following specification and by reference to the accompanying drawings, wherein an example of the invention is shown, and wherein:

Fig. 1 is a longitudinal, vertical, sectional view of a low temperature separation vessel constructed in accordance with this invention and adapted to carry out the methods of this invention, Figs. 2, 3, and 4, are vertical, cross-sectional views taken upon the respective lines of Fig. 1, Fig. 5 is an enlarged, fragmentary, vertical, sectional view of that portion of a low temperature separation vessel within which provision is made for the separate withdrawal of separated hydrocarbons and water, and the preferential withdrawal of accumulated interface materials, Fig. 6 is a view similar to Fig. 1 showing a modified form of the invention, and Fig. 7 is a fragmentary, horizontal, cross-sectional view, partly in elevation, of the outlet end of the modification shown in Fig. 6.

In the drawings, the numeral 10 designates an elongate, horizontal, low temperature separation vessel carried upon suitable supports 11 and having its ends closed by dished heads 12 and 13. A well stream inlet conductor 14 enters the vessel 10 laterally near the head 12 through a variable choke or other pressure reducing device 15 and terminates within the vessel in a centrifugal, preliminary separation structure 16. As pointed out hereinbefore, the well stream may initially be passed through a high pressure separator (not shown), and the liquid phase separated in the high pressure separator may be introduced into the vessel 10 through an inlet conductor 17 extending through the head 12. A heating coil 18 is provided in the lower portion of the vessel, a suitable heating medium, or the well stream prior to pressure reduction, being passed through the coil 18 for supplying heat to the lower portion of the vessel 10.

For maintaining hydrocarbon and water strata in the bottom of the vessel 10, an upstanding partition 19 extends transversely across the lower portion of the vessel adjacent the head 13 and defines with the head 13 a sump 20 into which liquids may flow. Further, an upstanding box 21 is positioned adjacent the partition 19 and between the partition and the inlet 14, the box including an upstanding partition 22 adjacent the partition 19 and extending from a point spaced above the bottom of the vessel 10 to a point spaced well above the upper edge of the partition 19. The box also includes a second partition 23 spaced from the partition 22 toward the inlet 14 and extending from a point spaced above the bottom of the vessel 10 to a horizontal elevation slightly above the upper edge of the partition 19, the lower edges of the partitions 22 and 23 being joined by an imperforate bottom plate 24 from which a distillate drain conductor 25 extends through the bottom of the vessel 11 and through a float controlled discharge valve 26. A float 27 disposed within the box 21 operates a suitable pilot mechanism 28, which, in turn, controls the operation of the discharge valve 26 to discharge accumulated liquids from the box 21 as said liquids accumulate therein. A similar discharge conductor 25' is provided for the sump 20 and extends through a float controlled discharge valve 26' substantially identical in all respects to the valve 26 and operated by means of a float 27' positioned within the sump 19 and operating a pilot control mechanism 28, which, in turn, operates the discharge valve in the discharge conductor 25'. The utilization of floats, pilot operating mechanisms, and float controlled valves in the discharging of liquids from separation vessels is well known in this art and does not require further description.

The well stream entering the vessel, having undergone a marked temperature reduction, will contain gaseous constituents, liquid water and hydrocarbon constituents, and usually, gas hydrates, along with various particles of foreign material. An initial separation of the liquid and gaseous constituents takes place in the separator structure 16, and as the stream subsequently flows horizontally through the vessel 10, the liquid and solid particles will settle to the bottom of the vessel, while the gas remains in the upper portion thereof to be withdrawn through the cold gas outlet 29. The separated water and hydrocarbon will stratify into respective strata due to their differing densities, the gas hydrates tending to accumulate at the interface between the water and hydrocarbon or distillate layers, or in some cases, tending to accumulate on the surface of the distillate layer. The foreign material, such as mud, iron sulphide emulsion, and the like, will tend to accumulate at the interface between the water and distillate layers.

The distillate layer, being uppermost, will, as it accumulates, flow over the upper edge of the partition 23 and into the box 21 for discharge through the outlet 25. The water, being lowermost in the vessel 10, will flow beneath the bottom 24 of the box 21, and upwardly in a U-tube path between the partitions 19 and 22 to overflow over the upper edge of the partition 19 into the sump 20 from which it is discharged through the outlet conductor 25'. The interface material, however, will tend to accumulate and remain at the interface level and will thus be prevented from discharging from the vessel whereby a heat transfer barrier between the water and distillate layers is established, and effective melting of hydrates or rectification of the distillate layer may be impeded or prevented.

To insure the preferential discharge of the foreign or interface material, the low temperature separation vessel is provided with an upstanding partition or baffle 30 adjacent the partition 23 and positioned between the partition 23 and the heating coil 18. The partition 30 extends from the bottom of vessel 10 to about the horizontal elevation of the interface level, and hence, material being withdrawn beneath the closed bottom of the box 21 is preferentially withdrawn from the interface level rather than the lowermost portion of the vessel 10. In this manner, any accumulated interface material is withdrawn and flows under the box 21 and over the partition 19 into the sump 20 before water is withdrawn to follow the same course of discharge. The discharge of distillate into the box 21 for withdrawal from the vessel is unaffected and continues in the usual manner, there being no tendency for the water or interface material to rise to the surface of the distillate and enter the box 21 as a contaminant of the distillate. Of course, this structure results in the immediate withdrawal of foreign or interface material from the interface level whereby the liquid discharged over the upper edge of the partition 30 and into the sump 20 is composed primarily of separated water, accompanied by small quantities of foreign or interface material as the latter is introduced into the low temperature separator. By this means, the interface level is maintained free of mud, dead bacteria, iron sulphide emulsion, and other foreign matter which may accumulate at that elevation, and the creation of a heat transfer barrier between the water layer heated by the coil 18, and the distillate layer or the gas hydrates is eliminated. The interface material is discharged along with the separated water and conducted to a pit or other point or suitable disposal.

The partition 22 functions strictly as a partition, and not as a weir, and hence, the upper edge of the partition 22 is normally fixed within the vessel 10. The upper edges of the partitions 19, 23 and 30, which function as weir structures, may, however, be made adjustable if desired, or one or more of said partitions may be provided with an adjustable upper extremity. In most instances, it is desired to expose as large a surface as possible of the distillate layer to the gas stratum, and hence, the upper edge of the partition 23 is preferably caused to coincide with the longitudinal axis of the vessel 10. As shown in Figs. 4 and 5, however, the upper edges of the partitions 19 and 30 may be made vertically adjustable in order to adjust or regulate the vertical elevation of the interface level, as well as the thickness of the zone at the interface level from which separated liquids are preferentially withdrawn. The adjustability of the partitions may be effected in any suitable or desirable manner, as by providing the upper edge of the partition 19 with an elongate notch 31 receiving a transverse weir plate 32 clamped within the notch by suitable bolts 33. By loosening of the bolts 33, the weir plate 32 may be moved upwardly and downwardly within the notch 31 to vary the effective elevation of the upper edge of the partition 19, and hence, to determine the liquid level maintained between the partitions 19 and 22. Similarly, the partition 30 may be provided in its upper edge with a notch 34 receiving a vertically adjustable weir plate 35 clamped to the partition 30 by bolts 36.

The interface between the water and distillate layers must, of course, be maintained above the upper edge of the weir plate 35, and this is achieved by vertical adjustment of the weir plate 32. Following this, vertical adjustment of the weir plate 35 will determine whether liquid is withdrawn from the interface level at a point immediately below the distillate layer, or at a point spaced slightly lower than said previous point. In addition, the upper edges of either the partitions 19 or 30 may be fixed, and only one of the partitions made adjustable in elevation, or in cases where all operating conditions are determined exactly in advance, the upper edges of all of the partitions may be fixed. In most instances, however, to cope with varying operating conditions, it is desirable that one or both of the partitions 19 and 30 have their upper edges arranged for vertical adjustment and regulation.

In some instances, the water and distillate strata are allowed to extend the full length of the low temperature separation vessel, the distillate discharge being controlled by a surface float and the water discharge by an interface float, or both being discharged through a single outlet controlled by a single float. In either case, the present invention may be adapted to insure the preferential withdrawal of interface material as shown in Figs. 6 and 7.

In this modification, the vessel 10 and its various fittings remain the same and are identified in the drawings by the same numerals. The box and partition structure 19 and 21 is omitted, however, as are the floats 27 and 27'. Instead, an upstanding flume or spill pot 37 is positioned near the outlet end head 13 of the vessel 10 and has an outlet conductor 38 extending therefrom through a motor or diaphragm valve 39. A float 40, provided between the flume 37 and the head 13, responds to the liquid level in the vessel to operate a conventional pilot valve 41 which, in turn, controls the opening and closing of the valve 39 in the usual manner.

The flume 37 is open-topped, and its upper edge 42 is located at such an elevation within the vessel 10 as to coincide with the statum of interface material or the lower boundary thereof. Thus, when the valve 39 is open, the interface material will be withdrawn in preference to liquid from the water layer, distillate also being withdrawn in accordance with its rate of accumulation. All three fluids will be discharged as they are collected in the vessel 10, but it is apparent that the interface material will be skimmed off preferentially, while layers of water and distillate are maintained in the vessel. Thus, the structure has the advantage not only of clearing all interface material from the vessel, but also of maintaining both water and distillate strata in the vessel while requiring only a single surface float and a single, valve-controlled, outlet conductor.

The major portions of the structures shown and described herein are disclosed in United States Letters Patent No. 2,747,002, issued May 22, 1956, and the present invention is an improvement thereover.

In carrying out the methods of this invention, a high pressure well stream is caused to undergo a pressure reduction and flowed into an enclosed separation area wherein the stream may resolve itself into gas, distillate, and water layers. The distillate and water layers are withdrawn separately or together, any foreign or interface materials tending to accumulate between the water and distillate layers being preferentially withdrawn by causing all withdrawal from the water layer to take place at an elevation closely adjacent the interface level between the distillate and water strata. By this means, the accumulation of a layer of interface material is avoided, and effective heat transfer, as desired at various points through the enclosed separation zone, is obtained.

As pointed out hereinbefore, there are instances in which no heat is applied to the low temperature separation vessel 10, so that no problems of heat flow or heat transfer arise. Nevertheless, the accumulation of a layer of foreign matter in the vessel may be undesirable or harmful to the operation of the system, and the elimination of such a layer may be indicated. Thus, the methods and structures of this invention find utility and value whether or not the vessel 10 receives heat.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The method of low temperature separation of high pressure well streams including the steps of; flowing the well stream through a temperature reduction step to precipitate water and liquid hydrocarbons therefrom; introducing the chilled stream into a separation zone wherein the stream stratifies in superposed gaseous, liquid hydrocarbon, foreign matter, and water layers; maintaining the water layer at a minimum height; withdrawing gas from the gaseous layer; skimming liquid hydrocarbons from the liquid hydrocarbon layer; flowing water and the foreign matter between the water and the liquid hydrocarbon layer in a U-tube path while maintaining the water layer of minimum thickness; and separately withdrawing the water and foreign matter from the end of the U-tube path at an elevation above the layer of foreign matter between the water and liquid hydrocarbon layers.

2. The method of low temperature separation of high pressure well streams containing foreign matter including the steps of; flowing the well stream through a temperature reduction step to precipitate water and liquid hydrocarbons therefrom; introducing the chilled stream into a separation zone wherein the stream stratifies into superposed gaseous, liquid hydrocarbon, foreign matter, and water layers; maintaining the water layer at a minimum height; withdrawing gas from the gaseous layer; maintaining the liquid hydrocarbon layer at a minimum height; withdrawing liquid hydrocarbons from the liquid hydrocarbon layer; flowing foreign matter and water from the foreign matter layer and the portion of the water layer immediately therebeneath in a U-tube path while maintaining the water layer of minimum thickness; and separately withdrawing foreign matter and water from the end of the U-tube path at an elevation above the layer of foreign matter between the water and liquid hydrocarbon layers.

3. The method of low temperature separation of high pressure well streams containing foreign matter including the steps of; flowing the well stream through a temperature reduction step to precipitate water and liquid hydrocarbons therefrom; introducing the chilled stream into a separation zone wherein the stream stratifies into superposed gaseous, liquid hydrocarbon, foreign matter, and water layers; maintaining the water layer at a minimum height; withdrawing gas from the gaseous layer; maintaining the liquid hydrocarbon layer at a minimum height; withdrawing liquid hydrocarbons from the liquid hydrocarbon layer; flowing foreign matter and water from the foreign matter layer and only that portion of the water layer immediately therebeneath in a U-tube path while maintaining the water layer at a minimum height; and withdrawing foreign matter and water from the end of the U-tube path at an elevation above the elevation of the foreign matter layer and between the water and liquid hydrocarbon layers.

4. A low temperature separator for high pressure well streams including; means for chilling the well stream; a separator vessel; means for discharging the chilled stream into the vessel; a gas outlet from the vessel; means for maintaining superposed strata of liquid hydrocarbons, foreign matter, and water in the vessel at predetermined levels, comprising; at least one partition in the vessel enclosing a liquid hydrocarbon discharge enclosure, means for skimming liquid hydrocarbons from the liquid hydrocarbon stratum into the liquid hydrocarbon discharge enclosure, at least one partition in the vessel enclosing a water discharge enclosure, means for skimming water from the water stratum and foreign matter from the foreign matter stratum and discharging the water and foreign matter into the water discharge enclosure at an elevation above the foreign matter stratum between the liquid hydrocarbon and water strata; and outlet conductors leading from the liquid hydrocarbon and water discharge enclosures.

5. A low temperature separator for high pressure well streams including, a separator vessel, a well stream inlet conductor connected to the vessel, means for chilling the well stream prior to its discharge from the conductor into the vessel, a gas outlet from the vessel, a transverse water weir plate in the vessel spaced from the inlet conductor, an open top trough in the vessel between the water weir plate and the inlet conductor and having a transverse liquid hydrocarbon weir plate as one wall, the liquid hydrocarbon weir plate having its weir edge disposed at an elevation above the weir edge of the water weir plate, the water and liquid hydrocarbon weir plates maintaining water and foreign matter and liquid hydrocarbon strata in the vessel at predetermined levels, a baffle in the vessel between the trough and the inlet conductor and extending from the bottom of the vessel to a plane spaced below the liquid hydrocarbon strata, whereby water and the foreign matter between the water and liquid hydrocarbon strata are continuously withdrawn over the water weir plate a liquid hydrocarbon discharge conductor extending from the trough, and means for withdrawing from the vessel that water and foreign matter flowing over the water weir plate.

6. A low temperature separator for high pressure well streams including, an elongate horizontal separator vessel, a well stream inlet conductor connected to one end portion of the vessel, means for chilling the well stream prior to its discharge from the conductor into the vessel, a gas outlet leading from the vessel, a first upright partition in the opposite end portion of the vessel having its upper edge spaced from the top of the vessel and enclosing a water discharge sump, a second upright partition in the vessel adjacent the first partition and extending from a plane above the bottom of the vessel to a plane well above the upper edge of the first partition, a third partition in the vessel spaced from the second partition toward the inlet conductor and extending from a plane above the bottom of the vessel to a plane above the upper edge of the first partition, the second and third partitions enclosing a liquid hydrocarbon discharge sump, at least one wall in the vessel forming a portion of a water passage from the well stream inlet side of the liquid hydrocarbon discharge sump to the space between the first and second partitions, a fourth partition between the third partition and the inlet conductor and extending from the bottom of the vessel to a horizontal plane below the upper edge of the first partition, and liquid discharges from the water and liquid hydrocarbon sumps.

7. A low temperature separator for high pressure well streams including; means for chilling the well stream; a separator vessel; means for discharging the chilled stream into the vessel; a gas outlet from the vessel; means for maintaining superposed strata of liquid hydrocarbons and foreign matter and water in the vessel at predetermined levels including; a box arranged to upstand in the strata of hydrocarbon and foreign matter and water enclosing a liquid hydrocarbon discharge enclosure, the relative height of the sides of the box providing for skimming liquid hydrocarbons from the liquid hydrocarbon stratum into the liquid hydrocarbon discharge enclosure, a sump in the vessel formed in the vessel to enclose a water discharge enclosure, and means for skimming water and foreign matter between the water and hydrocarbon stratum into the water discharge enclosure of the sump at an elevation above the strata of foreign matter between the liquid hydrocarbon and water strata; and outlet conductors leading from the liquid hydrocarbon box and water discharge sump.

References Cited in the file of this patent
UNITED STATES PATENTS

| | | |
|---|---|---|
| 411,646 | Dorn et al. | Sept. 24, 1889 |
| 498,184 | McClelland | May 23, 1893 |
| 2,049,068 | Loupe | July 28, 1936 |
| 2,738,026 | Glasgow et al. | Mar. 13, 1956 |
| 2,751,998 | Glasgow | June 26, 1956 |